(No Model.)
E. B. ROBERTS.
CORE SAW.
No. 467,383. Patented Jan. 19, 1892.
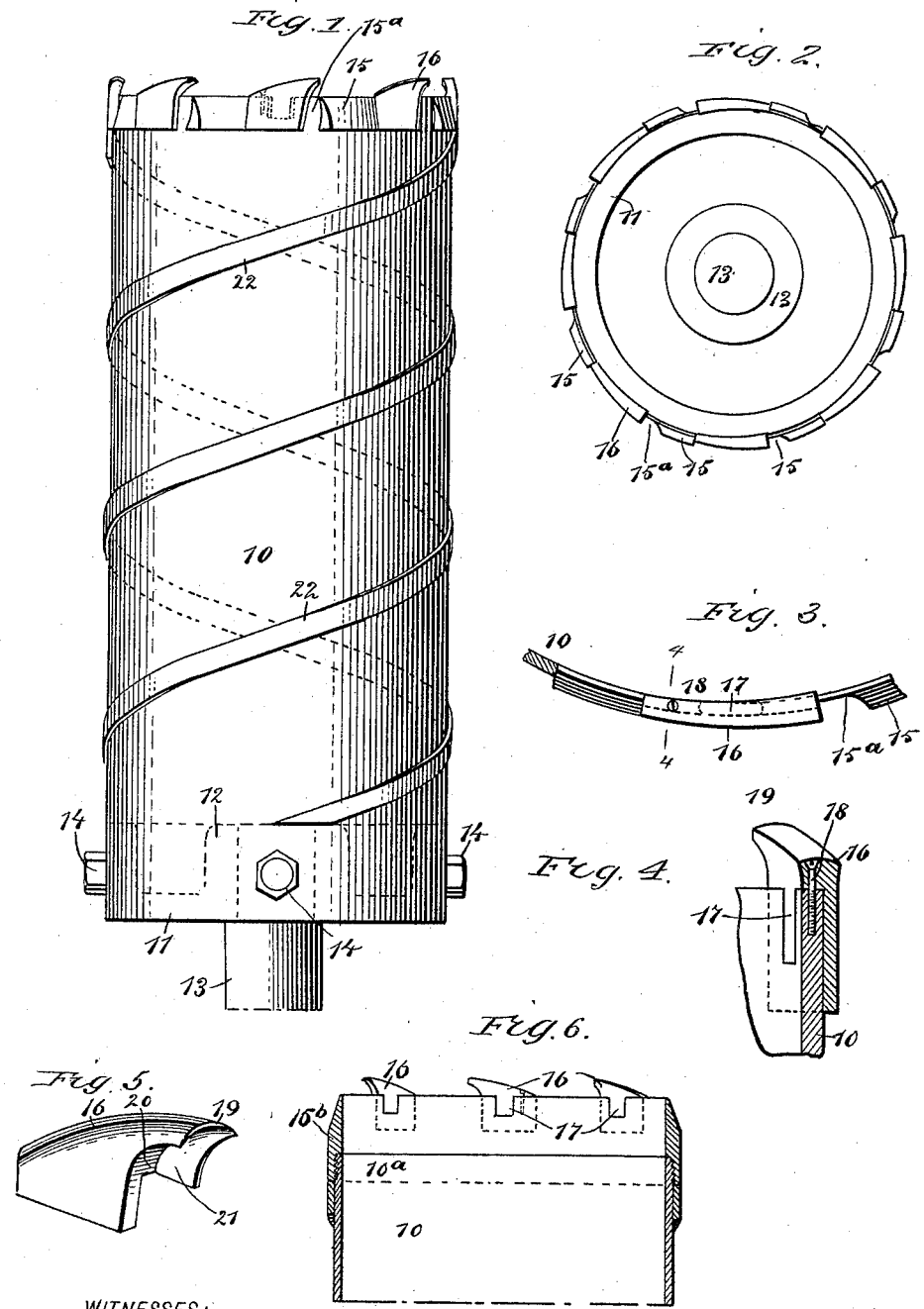
WITNESSES:
W. R. Davis
E. M. Clark
INVENTOR:
E. B. Roberts
BY Munn & Co.
ATTORNEYS

UNITED STATES PATENT OFFICE.

EDWIN B. ROBERTS, OF EMPORIA, KANSAS.

CORE-SAW.

SPECIFICATION forming part of Letters Patent No. 467,383, dated January 19, 1892.

Application filed March 10, 1891. Serial No. 384,462. (No model.)

*To all whom it may concern:*

Be it known that I, EDWIN B. ROBERTS, of Emporia, in the county of Lyon and State of Kansas, have invented a new and Improved Core-Saw, of which the following is a full, clear, and exact description.

My invention relates to improvements in core-saws; and the object of my invention is to produce a saw which may be driven rapidly into a body of wood for any desired distance and which is provided with means of clearance, so that it will not clog.

To this end my invention consists in a core-saw constructed substantially as hereinafter described and claimed.

Reference is to be had to the accompanying drawings, forming a part of this specification, in which similar figures of reference indicate corresponding parts in all the views.

Figure 1 is a side elevation of a saw embodying my invention. Fig. 2 is a plan view of the same. Fig. 3 is an enlarged broken plan, partly in section. Fig. 4 is a vertical cross-section on the line 4 4 in Fig. 3, showing the manner in which the teeth are secured in the saw-head. Fig. 5 is an enlarged detail perspective view showing the front construction of a tooth, and Fig. 6 is a detail sectional view of a modified form of the saw.

The body of the saw comprises a cylinder 10, which is thickened at the lower end, as shown at 11, and which is adapted to receive the head 12 of a vertical shaft 13, the saw being secured to the head by means of clamping-bolts 14. The upper end of the saw terminates in a head 15, which is beveled to an edge, the edge aligning with the inner wall of the cylinder, and the thicker or lower portion of the head 15 projects outward beyond the plane surface of the saw-body 10. The saw-teeth 16 are inserted at intervals in this thickened head 15, so as to project above the head, and the bottoms of the teeth are of the same thickness as the head 15. The teeth 16 are provided on one side with lugs 17, which fit in corresponding dovetail grooves in the head 15, as shown by dotted lines in Fig. 3, and the teeth are further secured to the head by means of screws 18, which pass downward through the back ends of the teeth and into the head, as best shown in Fig. 4. The saw-teeth 16 have projecting gouge-points 19, and the teeth are recessed beneath the point, as shown at 20 in Fig. 5, the head 15 being also recessed at a point adjacent to the recess of the teeth, as best shown in Figs. 1 and 3, so that the chips made by the saw may pass downward through the recesses of the teeth and through the recesses 15$^a$ of the head. The recess 20 in each of the saw-teeth is made on the outer side of the teeth, and a thin lip 21 is thus left on the inner side, and this lip prevents the chips from falling inside the saw and clogging the same.

In order that the chips which fall through the recesses of the saw-teeth and the head 15 may be carried from the bore and the saw kept perfectly clear, spiral bands 22 are produced upon the outer surface of the saw, these bands extending from the head 15 to the bottom of the saw, and the bands are of the same thickness as the lower portion of the head 15. As shown in the drawings, the saw is provided with two of these bands; but any necessary number may be provided.

In Fig. 6 I have shown the saw provided with a removable head 15$^b$, which is constructed exactly like the head 15, except that it is removable, and is threaded on the inner side, so as to fit a corresponding thread 10$^a$ at the top of the cylinder or body 10, and it will thus be seen that the teeth may be secured in the head and the head may be removed or placed in position very quickly and easily.

In constructing the saw it is desirable that the teeth be provided with gouge-points, as described, and the manner of attaching the teeth to the saw is also a convenient one; but the teeth may be provided with any suitable point and they may be attached to the saw in any convenient and substantial way.

To operate the saw it is revolved rapidly in a vertical position, as shown in Fig. 1, and the wood or other substance to be cored out is fed down from above. The chips will pass through the recesses of the teeth and head and the spiral bands will carry them to the bottom of the saw, and owing to the easy manner in which the saw clears itself it may be driven very rapidly into the material to be sawed.

Having thus described my invention, I claim as new and desire to secure by Letters Patent—

1. A core-saw comprising a tubular body having a series of teeth on its upper head or working edge, the inner faces of the teeth being flush with the interior wall of the body, each tooth being cut away beneath its gouge-like point from its outer face inward, as at 20, the guard-lip 21, projecting forward from the base of the recess and forming the inner wall thereof to prevent chips entering the interior of the body, and spiral ribs or bands on the outer side of the body flush with the outer sides of the teeth, the upper or working edge of the body being beveled between the several teeth, substantially as set forth.

2. A core-saw having external spiral bands and a removable head flush on its inner side with the interior of the body and on its exterior flush with said bands, and the removable teeth mounted on said head flush with its interior and exterior, the edge of the head being beveled between said cutters, substantially as set forth.

3. A core-saw comprising a cylindrical body having a thickened beveled head and removable teeth secured in the head, the head and teeth being recessed, substantially as and for the purpose specified.

4. A core-saw comprising a cylindrical body having at one end a beveled recessed head, removable teeth secured in the head and having recesses to correspond with the head-recess, and spiral bands secured to the saw-body and extending throughout its length, substantially as described.

5. In a core-saw, the combination, with the head or working edge having a lateral recess, of the tooth 10, having a gouge-lip 19, a recess 20, a lip 21, flush with its inner face, and the side lug 17, entering said recess, substantially as set forth.

6. In a core-saw, the combination, with the thickened head having dovetail recesses therein, of the removable saw-teeth having lugs on one side to fit the recesses, substantially as described.

EDWIN B. ROBERTS.

Witnesses:
FLOYD TRAVIS,
GEORGE S. HARRINGTON.